(12) United States Patent
Chen et al.

(10) Patent No.: US 10,887,066 B2
(45) Date of Patent: Jan. 5, 2021

(54) METHOD, DEVICE, AND SYSTEM FOR DETERMINING TRANSMISSION INFORMATION

(71) Applicant: ZTE CORPORATION, Guangdong (CN)

(72) Inventors: Zewei Chen, Shenzhen (CN); Jun Xu, Shenzhen (CN); Jin Xu, Shenzhen (CN); Bo Dai, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 179 days.

(21) Appl. No.: 16/085,726

(22) PCT Filed: Mar. 10, 2017

(86) PCT No.: PCT/CN2017/076299
§ 371 (c)(1),
(2) Date: Sep. 17, 2018

(87) PCT Pub. No.: WO2017/157247
PCT Pub. Date: Sep. 21, 2017

(65) Prior Publication Data
US 2020/0213056 A1 Jul. 2, 2020

(30) Foreign Application Priority Data
Mar. 15, 2016 (CN) .......................... 2016 1 0148005

(51) Int. Cl.
*H04L 5/00* (2006.01)
*H04L 1/00* (2006.01)
*H04W 72/04* (2009.01)

(52) U.S. Cl.
CPC .......... *H04L 5/0053* (2013.01); *H04L 1/0003* (2013.01); *H04L 5/0044* (2013.01);
(Continued)

(58) Field of Classification Search
None
See application file for complete search history.

(56) References Cited

U.S. PATENT DOCUMENTS

2011/0090808 A1* 4/2011 Chen ............... H04L 1/0006
370/252
2013/0308504 A1* 11/2013 Nimbalker .......... H04L 5/003
370/281
(Continued)

FOREIGN PATENT DOCUMENTS

CN 101917765 12/2010

OTHER PUBLICATIONS

Huawei et al., "DCI for NB-IoT", 3GPP TSG RAN WG1 Meeting #84 R1-160323, Feb. 19, 2016, sections 2.
(Continued)

*Primary Examiner* — Michael J Moore, Jr.
(74) *Attorney, Agent, or Firm* — Foley & Lardner LLP (57) ABSTRACT

Provided are a method, a device, and a system for determining transmission information. The method includes determining, by a first node, transmission information according to a predetermined information combination in downlink control information, DCI, transmitted by a second node. The transmission information includes a modulation coding scheme, joint information of a modulation coding scheme and a sub-carrier position, or sub-carrier position information. The predetermined information combination includes one of the following: a combination of a modulation-coding-scheme indicator domain $I_{MCS}$ and a number of allocated sub-carriers, and a combination of a resource-unit, RU, number indicator domain and a number of allocated sub-carriers.

18 Claims, 1 Drawing Sheet

(52) U.S. Cl.
CPC ......... *H04L 5/0094* (2013.01); *H04W 72/042* (2013.01); *H04W 72/0453* (2013.01)

(56) References Cited

U.S. PATENT DOCUMENTS

| | | | |
|---|---|---|---|
| 2015/0237644 A1* | 8/2015 | Golitschek Edler von Elbwart | H04L 1/1893 370/329 |
| 2018/0102890 A1* | 4/2018 | Yi | H04L 5/0053 |
| 2018/0332566 A1* | 11/2018 | You | H04L 1/0079 |
| 2019/0036640 A1* | 1/2019 | Xu | H04L 1/1819 |
| 2020/0136781 A1* | 4/2020 | Yi | H04L 5/0053 |

OTHER PUBLICATIONS

Huawei et al., "DCI for NB-IoT", 3GPP TSG RAN WG1 Meeting #84B1S R1-162626, Apr. 15, 2016, sections 2-4.

International Search Report and Written Opinion for International Appl. No. PCT/CN2017/076299, dated Jun. 1, 2017.

ZTE; "Consideration on uplink data transmission for NB-IoT", 3GPP TSG RAN WG1 NB-IoT Meeting #84 RL-160480, Feb. 19, 2016.

\* cited by examiner

METHOD, DEVICE, AND SYSTEM FOR DETERMINING TRANSMISSION INFORMATION

CROSS REFERENCE TO RELATED APPLICATION

This is a National stage application, filed under 35 U.S.C. 371, of International Patent Application No. PCT/CN2017/076299, filed on Mar. 10, 2017, which claims priority to Chinese Patent Application No. CN201610148005.8 filed on Mar. 15, 2016, contents of both of which are incorporated herein by reference in their entireties.

TECHNICAL FIELD

Embodiments of the present disclosure relate to, but are not limited to, a communications field, and, in particular, to a method, device, and system for determining transmission information.

BACKGROUND

User equipment, UE, of Machine Type Communication, MTC, also referred to as Machine to Machine, M2M, is currently the primary application mode of the Internet of Things. Several techniques applicable to the cellular Internet of Things are disclosed in the technical report TR45.820V200 of the 3rd Generation Partnership Project, 3GPP. Among the several techniques, the NarrowBand Internet of Things, NB-IoT, draws the most attention. An NB-IoT system has a bandwidth of 200 kilohertz, kHz, and the bandwidth is identical to the channel bandwidth of a Global System for Mobile Communication, GSM, which greatly helps the NB-IoT system to reuse a GSM spectrum and reduce mutual interference with a GSM channel. The NB-IoT has a transmission bandwidth of 180 kHz, and the transmission bandwidth is identical to the bandwidth of one Physical Resource Block, PRB, of a Long-Term Evolution, LTE, system. The NB-IoT has 3.75 kHz and 15 kHz uplink sub-carrier spacing and the 15 kHz uplink sub-carrier spacing is identical to that of the LTE system.

In the LTE system, the equipment transmits uplink data to a base station through a Physical Uplink Shared Channel, PUSCH. The base station estimates and schedules channels according to an uplink reference signal, allocates time and frequency domain resources for uplink transmission of the equipment, and determines a transport block size and a modulation coding scheme of the uplink transmission. The base station transmits Downlink Control Information, DCI, to the equipment, and the DCI carries $I_{MCS}$ information and resource indication information. An $I_{MCS}$ essentially corresponds to one respective combination of the modulation coding scheme, and the equipment can obtain the modulation coding scheme of the uplink data and further find, according to the modulation coding scheme and the number of allocated Physical Resource Blocks Nprb, the mapping relationship table of the ITBS/Nprb on to a TBS, and the mapping relationship table presents the transport block size, TBS. The equipment processes a transport block on a transmission side such as modulation coding according to the obtained modulation coding scheme and maps the uplink data onto the corresponding time and frequency domain resources. The equipment transmits data to the base station.

An LTE/Long-Term Evolution Advanced (LTE-A) system has great differences from the NB-IoT system in the aspects of system bandwidths, multiple accesses, coding schemes, and resource allocation. For example, single-tone transmission and multi-tone transmission are introduced in the uplink of the NB-IoT system. The NB-IoT defines different Resource Units, RUs, for the single-tone transmission and the multi-tone transmission respectively. One RU refers to the minimum scheduled resources. Different RUs may have different available Resource Elements, REs. In addition, pi/2 Binary Phase Shift Key, pi/2BPSK and pi/4 Quadrature Phase Shift Keying, pi/4QPSK are introduced in uplink modulation scheme, and Tone Phase Shift Keying, TPSK may also be introduced in the uplink modulation scheme. The introduction of a new resource allocation method and a new modulation scheme directly affects a table design of a Modulation and Coding Scheme, MCS (hereinafter referred to as modulation coding scheme) and the Transmission Block Size, TBS, and the determination of the transport block size. This causes that the method of determining the modulation coding scheme and the transport block size and the method of allocating the resource in the LTE system and LTE-A system cannot be applied to the NB-IoT system. In the existing art, the method of determining modulation coding information and the transport block size and the method of allocating the resource are not provided for the NB-IoT system, resulting in incorrect coding-decoding and resource allocation in the NB-IoT system.

No effective solution to the problem that correct coding-decoding and resource allocation cannot be performed in the NB-IoT system exists in the existing art.

SUMMARY

The following is a summary of the subject matter described herein in detail. This summary is not intended to limit the scope of claims.

Embodiments of the present disclosure provide a method, device, and system for determining transmission information so that correct coding-decoding and resource allocation may be performed in the NB-IoT system.

According to one aspect, embodiments of the present disclosure provide a method for determining transmission information. The method includes the following steps.

A first node determines transmission information according to a predetermined information combination in downlink control information (DCI) transmitted by a second node. The transmission information includes a modulation coding scheme, joint information of the modulation coding scheme and a sub-carrier position, or sub-carrier position information. The predetermined information combination includes one of the following: a combination of a modulation-coding-scheme indicator domain IMCS and a number of allocated sub-carriers, and a combination of a resource-unit (RU) number indicator domain and the number of allocated sub-carriers.

In an embodiment, determining the transmission information according to the predetermined information combination includes one of the following modes.

In a first mode, according to the modulation-coding-scheme indicator domain IMCS and the number of allocated sub-carriers, one of the following is determined: the modulation coding scheme and the joint information of the modulation coding scheme and the sub-carrier position.

In a second mode, according to the resource-unit (RU) number indicator domain and the number of allocated sub-carriers, the sub-carrier position information is determined.

In an embodiment, determining the transmission information according to the predetermined information combination in the first mode includes the following: different sub-carrier numbers are divided into N0 mutually exclusive sets of sub-carrier numbers, each set of N0 mutually exclusive sets being corresponding to one respective set of modulation schemes; and according to the number of allocated sub-carriers, the one respective set of modulation schemes is determined. The elements of sets of the modulation schemes include at least one of the following: binary phase shift keying (BPSK), quadrature phase shift keying (QPSK), pi/2 BPSK, pi/4 QPSK, and (M,N)-TPSK. The (M,N)-TPSK is carrier phase shift keying (TPSK) defined by a specified carrier number M and a specified constellation point number N, and N1 sets of the modulation schemes corresponding to the N0 mutually exclusive sets of sub-carrier numbers are mutually exclusive, where M, N and N0 are positive integers.

In an embodiment, in the predetermined information combination in the first mode: when the number of allocated sub-carriers is larger than a first predetermined value S1, spectral efficiency corresponding to a modulation coding scheme indicated by the $I_{MCS}$ belongs to a first set A, and elements of the first set A are spectral efficiency obtained by multiplying all spectral efficiency corresponding to the modulation coding scheme indicated by the $I_{MCS}$ by a specified factor A1 when the number of allocated sub-carriers is equal to S1; when the number of allocated sub-carriers is larger than the first predetermined value S1, the spectral efficiency corresponding to the modulation coding scheme indicated by the $I_{MCS}$ belongs to the first set A, and elements of the first set A are spectral efficiency obtained by multiplying all spectral efficiency corresponding to a specified modulation scheme by the specified factor A1 when the number of allocated sub-carriers is equal to S1, where S1 is a positive integer and A1 is a real number larger than 0.

In an embodiment, determining the transmission information according to the predetermined information combination in the first mode includes the following: when the number of allocated sub-carriers is smaller than a second predetermined value S2, all available values of the $I_{MCS}$ are used for indicating the modulation coding scheme and the modulation coding scheme is determined according to the $I_{MCS}$, where S2 is a positive integer larger than 1.

In an embodiment, determining the transmission information according to the predetermined information combination in the first mode includes the following:

When the number of allocated sub-carriers is larger than a third predetermined value S3 and when a value of the $I_{MCS}$ belongs to a first predetermined set B1, the modulation coding scheme is determined by the $I_{MCS}$. When the number of allocated sub-carriers is larger than a third predetermined value S3 and the value of the $I_{MCS}$ belongs to a second predetermined set B2, the joint information of the modulation coding scheme and the sub-carrier position is determined by the $I_{MCS}$, or the $I_{MCS}$ indicates no information, where B1 and B2 constitute a subset of a set of all possible values of the $I_{MCS}$, B1 and B2 are mutually exclusive when B1 and B2 are both non-empty sets, and S3 is a positive integer.

In an embodiment, the predetermined sets B1 and B2 have one of the following features.

The first predetermined set B1 is composed of values of the $I_{MCS}$ smaller than or equal to a fourth predetermined value X1 and larger than or equal to a fifth predetermined value X2, and the second predetermined set B2 is composed of values of the $I_{MCS}$ larger than the fourth predetermined value X1 and values of the $I_{MCS}$ smaller than the fifth predetermined value X2.

Alternatively, the first predetermined set B1 is composed of values of the $I_{MCS}$ smaller than or equal to the fourth predetermined value X1, and the second predetermined set B2 is composed of values of the $I_{MCS}$ larger than the fourth predetermined value X1.

X1 and X2 are non-negative integers and X2 is smaller than or equal to X1.

In an embodiment, determining the joint information of the modulation coding scheme and the sub-carrier position by the $I_{MCS}$ includes the following: The $I_{MCS}$ and a sub-carrier position information indicator domain jointly indicate the joint information of the modulation coding scheme and the sub-carrier position. The sub-carrier position information indicator domain is used for determining the number of allocated sub-carriers.

In an embodiment, determining the transmission information according to the predetermined information combination in the first mode includes the following: X4 bits in X3 bits of the modulation-coding-scheme indicator domain $I_{MCS}$ are used for indicating the modulation coding scheme or indicating the joint information of the modulation coding scheme and the sub-carrier position, and the rest (X3-X4) bits are used for indicating the sub-carrier position, where X3 and X4 are positive integers and X4 is smaller than X3.

In an embodiment, determining the sub-carrier position information according to the resource-unit (RU) number indicator domain and the number of allocated sub-carriers includes the following: X6 bits in X5 bits of the RU number indicator domain are used for indicating an RU number, and the rest (X5-X6) bits are used for indicating the sub-carrier position, where X5 and X6 are positive integers and X6 is smaller than X5.

In an embodiment, determining the sub-carrier position information according to the resource-unit (RU) number indicator domain and the number of allocated sub-carriers includes the following: the RU number indicator domain and the sub-carrier position information indicator domain jointly indicate the sub-carrier position. The sub-carrier position information indicator domain is used for determining the number of allocated sub-carriers.

In an embodiment, determining the sub-carrier position information according to the resource-unit (RU) number indicator domain and the number of allocated sub-carriers includes the following: when the number of allocated sub-carriers is larger than a sixth predetermined value S4, or when the first node uses a TPSK modulation scheme for transmission, determining, according to the RU number indicator domain, the sub-carrier position information, wherein S4 is a positive integer.

In an embodiment, the predetermined information combination further comprises: the modulation-coding-scheme indicator domain $I_{MCS}$, the number of allocated sub-carriers, and the RU number indicator domain.

after the first node determines the modulation coding scheme, the method further comprises: determining, by the first node, a transport block size according to the modulation coding scheme and an RU number, where the RU number comprises one of the following features.

Different RUs have an identical number of available resource elements (REs).

When the number of allocated sub-carriers is larger than 1, the RU number is a positive integer multiple of the number of allocated sub-carriers.

When a modulation scheme is TPSK, the RU number is a positive integer multiple of the number of allocated sub-carriers.

In an embodiment, a set of values of a RU comprises the following elements: the smallest R1 continuous positive integers and the largest R2 integer powers of 2 where R1 and R2 are both positive numbers larger than or equal to 2, the sum of R1 and R2 is smaller than or equal to R, and R is a number of available values of the RU.

In an embodiment, the number of allocated sub-carriers is determined according to a sub-carrier position information indicator domain in the DCI.

According to another aspect, embodiments of the present disclosure further provide a device for determining transmission information located in a first node. The device includes a receiving module 22 and a determining module 24.

The receiving module (22), configured to receive Downlink Control Information, DCI, transmitted by a second node.

The determining module (24), configured to determine transmission information according to a predetermined information combination in the DCI, where the transmission information comprises: a modulation coding scheme, joint information of the modulation coding scheme and a sub-carrier position, or sub-carrier position information; and the predetermined information combination comprises one of the following: a combination of a modulation-coding-scheme indicator domain $I_{MCS}$ and a number of allocated sub-carriers, and a combination of a Resource-Unit, RU, number indicator domain and the number of allocated sub-carriers.

In an embodiment, the determining module 24 determining the transmission information according the predetermined information combination comprises the determining module (24) determining the transmission information using one of the following modes.

In a first mode, the determining module (24) determines, according to the modulation-coding-scheme indicator domain $I_{MCS}$ and the number of allocated sub-carriers, one of the following: the modulation coding scheme and the joint information of the modulation coding scheme and the sub-carrier position.

In a second mode, the determining module (24) determines, according to the Resource-Unit, RU, number indicator domain and the number of allocated sub-carriers, the sub-carrier position information.

In an embodiment, the predetermined information combination further comprises: the modulation-coding-scheme indicator domain $I_{MCS}$, the number of allocated sub-carriers, and the Resource-Unit, RU, number indicator domain.

The determining module (24) is further configured to determine a transport block size according to the modulation coding scheme and an RU number, wherein the RU number comprises one of the following features.

Different RUs have an identical number of available resource elements (REs).

When the number of allocated sub-carriers is larger than 1, the RU number is a positive integer multiple of the number of allocated sub-carriers.

When a modulation scheme is TPSK, the RU number is a positive integer multiple of the number of allocated sub-carriers.

In an embodiment, a set of values of a RU comprises the following elements: the smallest R1 continuous positive integers and the largest R2 integer powers of 2, where R1 and R2 are both positive numbers larger than or equal to 2, the sum of R1 and R2 is smaller than or equal to R, and R is a number of available values of the RU.

According to another aspect, embodiments of the present disclosure further provide a system for determining transmission information, including a first node and a second node.

The first node determines transmission information according to a predetermined information combination in Downlink Control Information, DCI, transmitted by the second node, the transmission information comprises a modulation coding scheme, joint information of the modulation coding scheme and a sub-carrier position, or sub-carrier position information, and the predetermined information combination comprises one of the following: a combination of a modulation-coding-scheme indicator domain $I_{MCS}$ and a number of allocated sub-carriers, and a combination of a Resource-Unit (RU), number indicator domain and the number of allocated sub-carriers.

According to another aspect, embodiments of the present disclosure further provide a computer-readable storage medium, which is configured to store computer-executable instructions for executing the method described above.

According to embodiments of the present disclosure, a first node determines transmission information according to a predetermined information combination in downlink control information (DCI) transmitted by a second node. The transmission information includes a modulation coding scheme, joint information of the modulation coding scheme and a sub-carrier position, or sub-carrier position information. The predetermined information combination includes one of the following: a combination of a modulation-coding-scheme indicator domain IMCS and a number of allocated sub-carriers, and a combination of a resource-unit (RU) number indicator domain and the number of allocated sub-carriers. The problem that correct coding-decoding and resource allocation cannot be performed in the NB-IoT system is solved and the determination of modulation coding information, a transport block size, and sub-carrier position information may be achieved.

Other aspects can be understood after the accompanying drawings and detailed description are read and understood.

DETAILED DESCRIPTION

Embodiments of the present disclosure will be detailed below with reference to the accompanying drawings. If not in collision, the embodiments described herein and the features thereof may be combined with each other.

It is to be noted that the terms "first", "second" and the like in the description, claims and drawings of the present application are used to distinguish between similar objects and are not necessarily used to describe a particular order or sequence.

In the embodiments of the present disclosure, a first node is equipment and a second node is a base station. It is certain that the first node may also be a base station and the second node may also be equipment.

Embodiment 1

Figure 1:
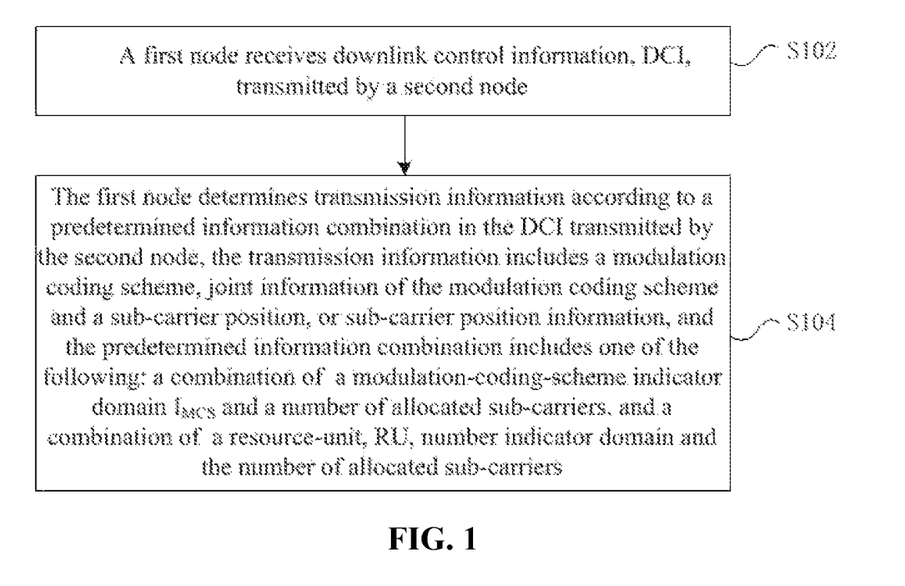
FIG. 1 is a flowchart of a method for determining transmission information according to embodiments of the present disclosure.

The embodiment provides a method for determining transmission information. FIG. 1 is a flowchart of a method for determining transmission information according to embodiments of the present disclosure. As shown in FIG. 1, the process of the method includes the following steps.

In S102, the first node receives the Downlink Control Information, DCI, transmitted by the second node.

In S104, the first node determines transmission information according to a predetermined information combination in the DCI transmitted by the second node. The transmission information includes a modulation coding scheme, joint information of the modulation coding scheme and a sub-carrier position, or sub-carrier position information. The predetermined information combination includes one of the following: a combination of a modulation-coding-scheme indicator domain $I_{MCS}$ and a number of allocated sub-carriers, and a combination of a Resource-Unit, RU, number indicator domain and the number of allocated sub-carriers.

The joint information of the modulation coding scheme and the sub-carrier position may be joint information of resource allocation and code rates as an example, which is described in detail in embodiment 3.

In the above steps, the first node determines, according to the predetermined information combination in the DCI transmitted by the second node, where the transmission information includes the modulation coding scheme, the joint information of the modulation coding scheme and the sub-carrier position, or the sub-carrier position information. The predetermined information combination includes one of the following: a combination of the modulation-coding-scheme indicator domain $I_{MCS}$ and the number of allocated sub-carriers, and a combination of the RU number indicator domain and the number of allocated sub-carriers. The method solves the problem that correct coding-decoding and resource allocation cannot be performed in the NB-IoT system and can achieve the determination of modulation coding information, a transport block size, and sub-carrier position information in the NB-IoT system according to the above steps.

In the embodiment, the step of the first node determining the transmission information according to the predetermined information combination includes one of the following modes.

In a first mode, according to the modulation-coding-scheme indicator domain $I_{MCS}$ and the number of allocated sub-carriers, one of the following is determined: the modulation coding scheme and the joint information of the modulation coding scheme and the sub-carrier position.

In a second mode, according to the RU number indicator domain and the number of allocated sub-carriers, the sub-carrier position information is determined.

In the embodiment, the step of the first node determining the transmission information according to the predetermined information combination in the first mode includes the following: different sub-carrier numbers are divided into N0 mutually exclusive sets of sub-carrier numbers, each of N0 mutually exclusive sets is corresponding to one respective set of modulation schemes, and the one respective set of modulation schemes is determined according the number of allocated sub-carriers. The elements of sets of modulation schemes include at least one of the following: Binary Phase Shift Keying, BPSK, Quadrature Phase Shift Keying, QPSK, pi/2 BPSK, pi/4 QPSK, and (M,N)-TPSK, where the (M,N)-TPSK is Tone Phase Shift Keying, TPSK, defined by a specified carrier number M and a specified constellation point number N, and the N1 sets of the modulation schemes are corresponding to the N0 mutually exclusive sets of sub-carrier numbers are mutually exclusive, where M, N, N0 and N1 are positive integers. Because one sub-carrier may correspond to at least one modulation schemes, N1 may be identical to or different from N0. That the N1 sets of the modulation schemes are mutually exclusive refers to that modulation schemes corresponding to different sub-carriers are different.

In the embodiment, the first mode has the following feature: when the number of allocated sub-carriers is larger than a first predetermined value S1, spectral efficiency corresponding to a modulation coding scheme indicated by the $I_{MCS}$ belongs to a first set A, and elements of the first set A are spectral efficiency obtained by multiplying all spectral efficiency corresponding to the modulation coding scheme indicated by the $I_{MCS}$ by a specified factor A1 when the number of allocated sub-carriers is equal to the S1, where S1 is a positive integer and A1 is a real number larger than 0.

In the embodiment, the first mode may further include the following feature: when the number of allocated sub-carriers is larger than the first predetermined value S1, the spectral efficiency corresponding to the modulation coding scheme indicated by the $I_{MCS}$ belongs to the first set A, and elements of the first set A are spectral efficiency obtained by multiplying all spectral efficiency corresponding to a specified modulation scheme by the specified factor A1 when the number of allocated sub-carriers is equal to the S1, where S1 is a positive integer and A1 is a real number larger than 0. The specified modulation scheme is at least one of the following: the BPSK, the QPSK, pi/2 BPSK, and pi/4 QPSK.

In the embodiment, when the number of allocated sub-carriers is smaller than a second predetermined value S2, all available values of the $I_{MCS}$ are used for indicating the modulation coding scheme and the modulation coding scheme is determined according to the $I_{MCS}$, where S2 is a positive integer larger than 1.

In the embodiment, when the number of allocated sub-carriers is larger than a third predetermined value S3, the first mode includes the following features.

When a value of the $I_{MCS}$ belongs to a first predetermined set B1, the modulation coding scheme is determined by the $I_{MCS}$. When the value of the $I_{MCS}$ belongs to a second predetermined set B2, the joint information of the modulation coding scheme and the sub-carrier position is determined by the $I_{MCS}$, or the $I_{MCS}$ indicates no information. The first predetermined set B1 and the second predetermined set B2 constitute a subset of a set of all available values of the $I_{MCS}$ (the B1 is a non-empty set and the B2 is a non-empty set) and the B1 and the B2 are mutually exclusive when the B1 and the B2 are both non-empty sets. S3 is a positive integer.

In the embodiment, the first predetermined set B1 and the second predetermined set B2 have one of the following features.

The first predetermined set B1 is composed of values of the $I_{MCS}$ smaller than or equal to a fourth predetermined value X1 and larger than or equal to a fifth predetermined value X2, and the second predetermined set B2 is composed of values of the $I_{MCS}$ larger than the fourth predetermined value X1 and values of the $I_{MCS}$ smaller than the fifth predetermined value X2.

Alternatively, the first predetermined set B1 is composed of values of the $I_{MCS}$ smaller than or equal to the fourth predetermined value X1, and the second predetermined set B2 is composed of values of the $I_{MCS}$ larger than the fourth predetermined value X1.

X1 and X2 are non-negative integers and X2 is smaller than or equal to X1.

In the embodiment, the step of determining the joint information of the modulation coding scheme and the sub-carrier position by the $I_{MCS}$ includes the following: the $I_{MCS}$ and a sub-carrier position information indicator domain jointly indicate the joint information of the modulation coding scheme and the sub-carrier position (for details, see application embodiment 4), and the sub-carrier position information indicator domain is configured to determine the number of allocated sub-carriers.

In the embodiment, the step of determining the transmission information according to the predetermined information combination in the first mode includes the following: X4 bits of X3 bits of the modulation-coding-scheme indicator domain $I_{MCS}$ are used to indicate the modulation coding scheme or indicate the joint information of the modulation coding scheme and the sub-carrier position, and the rest (X3-X4) bits are used to indicate the sub-carrier position, where X3 and X4 are positive integers and X4 is smaller than X3.

In the embodiment, the step of determining the sub-carrier position information according to the RU number indicator domain and the number of allocated sub-carriers includes the following: X6 bits in X5 bits of the RU number indicator domain are used to indicate an RU number, and the rest (X5-X6) bits are used to indicate the sub-carrier position, where X5 and X6 are positive integers and X6 is smaller than X5.

In the embodiment, the step of determining the sub-carrier position information according to the RU number indicator domain and the number of allocated sub-carriers in the second mode includes the following: the RU number indicator domain and the sub-carrier position information indicator domain jointly indicate the sub-carrier position (for details, see application embodiment 1), and the sub-carrier position information indicator domain is configured to determine the number of allocated sub-carriers.

In the embodiment, the step of determining the sub-carrier position information according to the RU number indicator domain and the number of allocated sub-carriers in the second mode includes the following: when the number of allocated sub-carriers is larger than a sixth predetermined value S4, or when the first node uses the TPSK modulation scheme for transmission, the sub-carrier position information is determined according to the RU number indicator domain, where S4 is a positive integer.

In the embodiment, the predetermined information combination further includes: the modulation-coding-scheme indicator domain $I_{MCS}$, the number of allocated sub-carriers, and the RU number indicator domain. After the first node determines the modulation coding scheme, the method further includes that the first node determines a transport block size according to the modulation coding scheme and the RU number. The RU includes at least one of the following features.

Different RUs have an identical number of available resource elements (REs).

When the number of allocated sub-carriers is larger than 1, the RU number is a positive integer multiple of the number of allocated sub-carriers. In embodiments of the present disclosure, the number of allocated sub-carriers may be integer powers of 2 and correspond to the TPSK modulation scheme.

When the modulation scheme is TPSK, the RU number is a positive integer multiple of the number of allocated sub-carriers.

In the embodiment, a set of values of the RU includes the following elements: the smallest R1 continuous positive integers and the largest R2 integer powers of 2, where R1 and R2 are both positive numbers larger than or equal to 2, the sum of R1 and R2 is smaller than or equal to R, and R is a number of available values of the RU.

In the embodiment, the number of allocated sub-carriers is determined according to the sub-carrier position information indicator domain in the DCI.

Embodiment 2

The embodiment provides a device for determining transmission information, and the device is configured to implement the above-mentioned method embodiment and various embodiments. What has been described is omitted hereinafter. As used below, the term "module" may be software, hardware or a combination thereof capable of implementing predetermined functions. The device described below in the embodiment may be implemented by software, but implementation by hardware or by a combination of software and hardware is also possible and conceived.

Figure 2:
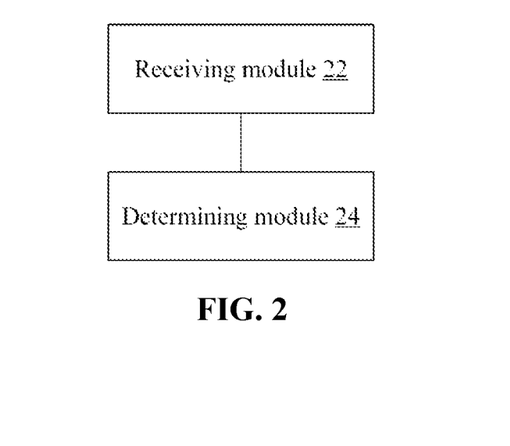
FIG. 2 is a block diagram illustrating a configuration of a device for determining transmission information according to embodiments of the present disclosure.

FIG. 2 is a block diagram illustrating a configuration of a device for determining transmission information according to embodiments of the present disclosure. As shown in FIG. 2, the device is located in a first node, and the device includes a receiving module 22 and a determining module 24.

The receiving module 22 is configured to receive the DCI transmitted by a second node.

The determining module 24 is connected to the receiving module 22 and is configured to determine transmission information according to a predetermined information combination in the DCI. The transmission information includes a modulation coding scheme, joint information of the modulation coding scheme and a sub-carrier position, or sub-carrier position information. The predetermined information combination includes one of the following: a combination of a modulation-coding-scheme indicator domain and a number of allocated sub-carriers, and a combination of the RU number indicator domain and the number of allocated sub-carriers.

In the above steps, the receiving module 22 receives the DCI transmitted by the second node and the determining module 24 determines the transmission information according to the predetermined information combination in the DCI, where the transmission information includes: the modulation coding scheme, the joint information of the modulation coding scheme and the sub-carrier position, or the sub-carrier position information. The predetermined information combination includes one of the following: the combination of the modulation-coding-scheme indicator domain $I_{MCS}$ and the number of allocated sub-carriers, and the combination of the RU number indicator domain and the number of allocated sub-carriers. The device solves the problem that correct coding-decoding and resource allocation cannot be performed in the NB-IoT system and can achieve the determination of modulation coding information, a transport block size, and sub-carrier position information in the NB-IoT system according to the above steps.

In the embodiment, the determining module 24 determining the transmission information according the predetermined information combination includes that the determining module 24 determines the transmission information by using one of the following modes.

In a first mode, the determining module 24 determines, according to the modulation-coding-scheme indicator domain $I_{MCS}$ and the number of allocated sub-carriers, one of the following: the modulation coding scheme and the joint information of the modulation coding scheme and the sub-carrier position.

In a second mode, the determining module 24 determines, according to the RU number indicator domain and the number of allocated sub-carriers, the sub-carrier position information.

In the embodiment, the predetermined information combination further includes: the modulation-coding-scheme indicator domain $I_{MCS}$, the number of allocated sub-carriers, and the RU number indicator domain. The determining module 24 is further configured to determine a transport block size according to the modulation coding scheme and an RU number, and the RU includes at least one of the following features.

Different RUs have an identical number of available resource elements (REs).

When the number of allocated sub-carriers is larger than 1, the RU number is a positive integer multiple of the number of allocated sub-carriers. In embodiments of the present disclosure, the number of sub-carriers may be integer powers of 2 and correspond to the TPSK modulation scheme.

When the modulation scheme is TPSK, the RU number is a positive integer multiple of the number of allocated sub-carriers.

In the embodiment, a set of values of the RU includes the following elements: the smallest R1 continuous positive integers and the largest R2 integer powers of 2, where R1 and R2 are both positive numbers larger than or equal to 2, the sum of R1 and R2 is smaller than or equal to R, and R is a number of available values of the RU.

Embodiment 3

In another aspect, embodiments of the present disclosure provide a system for determining transmission information, including a first node and a second node.

The first node determines transmission information according to a predetermined information combination in DCI transmitted by the second node. The transmission information includes a modulation coding scheme, joint information of the modulation coding scheme and a sub-carrier position, or sub-carrier position information. The predetermined information combination includes one of the following: the combination of a modulation-coding-scheme indicator domain $I_{MCS}$ and a number of allocated sub-carriers, and the combination of a RU number indicator domain and the number of allocated sub-carriers.

In the embodiments of the present application, the transmission information includes, but is not limited to, the modulation coding information, the transport block size, and the sub-carrier position information.

The embodiments of the present disclosure will be described below in detail through application embodiments.

Application Embodiment 1

In the embodiment, the base station in the LTE NB-IoT system estimates and schedules channels according to an uplink reference signal transmitted by equipment, allocates time and frequency domain resources for uplink transmission of the equipment, and determines the transport block size and the modulation coding scheme of the uplink transmission. The base station transmits the DCI to the equipment, where the DCI carries modulation and coding scheme indicator domain $I_{MCS}$ information and resource indication information. According to the $I_{MCS}$ (MCS index), the equipment obtains the modulation order, Transport Block Size, TBS, index (TBS index) $I_{TBS}$, and redundancy version $rv_{idx}$ of uplink data from a table of the modulation order, transport block size index, and redundancy version (also called an MCS table). Examples of the table of the modulation order, transport block size index, and redundancy version can be seen from tables 1.1 to 1.3.

Assuming that the equipment uses single carrier transmission in the examples, which refers to that only one carrier carries complex symbols. In the embodiment, the DCI carries 6 bits of resource indication information domain (i.e., the above-mentioned sub-carrier position information indicator domain) for indicating the joint information of the start position of allocated sub-carriers and the number of allocated sub-carriers. The resource indication information domain for indicating the joint information of the start position of allocated sub-carriers and the number of allocated sub-carriers refers to that one value of the resource indication information domain corresponds to one available combination of the start position of allocated sub-carriers and the number of allocated sub-carriers. The equipment reads resource indication information domain and obtains the number of allocated sub-carriers for uplink transmission. The DCI also carries an RU number indicator domain of 3 bits for indicating the number of RUs allocated to the equipment, and thus the equipment may obtain the RU number.

In the embodiment, the number of allocated sub-carriers for single carrier transmission may be 1, 2, or 4. The number of allocated sub-carriers is divided into three sets: {1}, {2}, and {4}. Three sets of the modulation scheme corresponding to the three sets {1}, {2}, and {4} are respectively {BPSK, QPSK} of Table 1.1, {(2,4-TPSK)} of Table 1.2, and {(4, 4-TPSK)} of Table 1.3, or are respectively {pi/2 BPSK, pi/4 QPSK} of Table 1.1, {(2,4-TPSK)} of Table 1.2, and {(4, 4-TPSK)} of Table 1.3. When the number of allocated sub-carriers is 1, 2, or 4, according to the $I_{MCS}$, the equipment may respectively obtain the modulation coding scheme and may further respectively obtain the redundancy version from Table 1.1, 1.2, or 1.3. In Table 1.1, when the modulation order is 1 and 2, the modulation scheme is respectively BPSK and QPSK, or respectively pi/2 BPSK and pi/4 QPSK. In Table 1.2, when the modulation order is 2, the modulation scheme is (2,4)-TPSK. In Table 1.3, when the modulation order is 2, the modulation scheme is (4,4)-TPSK. The (M, N)-TPSK is defined by the number of allocated sub-carriers M and the number of constellation points N in the Phase Shift Keying, PSK, constellation map. The $\log_2(N)$ bits of the bit sequence of $\log_2(M*N)$ bits are modulated to obtain one frequency domain signal, and the one frequency domain signal is mapped onto one of the M available allocated sub-carriers, and the rest $\log_2(M)$ bits other than the $\log_2(N)$ bits of the bit sequence of $\log_2(M*N)$ bits are used for indicating the position of the one of the M available allocated sub-carriers.

Spectral efficiency (i.e., spectral efficiency corresponding to the modulation and coding scheme indicated by the MCS levels of Tables 1.2 and 1.3) corresponding to the MCS levels of Tables 1.2 and 1.3 (each $I_{MCS}$ corresponds to one MCS level, the MCS level may be null, and when the MCS level is not null, the value of the MCS level indicates the modulation coding scheme) belongs to a set of the spectral efficiency corresponding to MCS levels of Table 1.1. The introduction of TPSK mainly produces a lower peak-to-average power ratio of the uplink signal transmitted by the equipment, thereby improving the power amplifier efficiency and energy efficiency of the equipment and expanding system coverage. At the same spectral efficiency, the code rates of (2,4)-TPSK and (4,4)-TPSK are higher than that of QPSK and a higher code rate may result in poor link performance. Therefore new higher or lower spectral efficiency is not introduced in Tables 1.2 and 1.3. The spectral efficiency in Tables 1.1 to 1.3 belongs to the set of the spectral efficiency obtained by multiplying the spectral efficiency in the MCS table of the Release 12 version of the 3GPP standard 36.213 by a specified factor. The specified factor is mainly used for keeping a constant product of the spectral efficiency and the number of allocated resource elements so that the same product of the spectral efficiency and the time and frequency resource size corresponds to the same TBS, and the new TBS table may reuse the tables in the standard.

In Table 1.1, all MCS levels are used for indicating the modulation coding scheme. In Table 1.1, when the number of allocated sub-carriers is 1, the resource allocation has smaller resource granularity and more flexible scheduling in the same time domain length. Therefore, after the introduction of TPSK and Tables 1.2 and 1.3, using all MCS levels in Table 1.1 can help to improve scheduling flexibility.

In Tables 1.2 and 1.3, when the $I_{MCS}$ is larger than 2 and 3 respectively, the MCS level corresponding to the $I_{MCS}$ does not indicate modulation coding information and the MCS level is null. The code rates of (2,4)-TPSK and (4,4)-TPSK are higher than that of QPSK at the same spectral efficiency. Since a code rate exceeding a certain value may hurt the decoding performance of turbo codes, the code rates of (2,4)-TPSK and (4,4)-TPSK are respectively limited below a certain value, such as 0.9 and 0.8. It is therefore unnecessary to occupy all MCS levels. These MCS levels which are not occupied are retained to simplify the design or to be used in subsequent designs.

TABLE 1.1

Modulation order, transport block size index, and redundancy version when the number of allocated sub-carriers is 1

| MCS index $I_{MCS}$ | Modulation order $Q_m$ | TBS index $I_{TBS}$ | Redundancy Version $rv_{idx}$ |
|---|---|---|---|
| 0 | 1 | 0(0)* | 0 |
| 1 | 2 | 1(2) | 0 |
| 2 | 2 | 2(4) | 0 |
| 3 | 2 | 3(6) | 0 |
| 4 | 2 | 4(8) | 0 |
| 5 | 2 | 2(4) | 2 |
| 6 | 2 | 3(6) | 2 |
| 7 | 2 | 4(8) | 2 |

*Most TBSs in the TBS table indicated by the $I_{TBS}$ outside parentheses are TBSs in the TBS table of the Release 12 version of the 3GPP standard 36.213 indicated by the $I_{TBS}$ in parentheses (the modification of individual TBSs is not excluded).

TABLE 1.2

Modulation order, transport block size index, and redundancy version when the number of allocated sub-carriers is 2

| MCS index $I_{MCS}$ | Modulation order $Q_m$ | TBS index $I_{TBS}$ | Redundancy Version $rv_{idx}$ |
|---|---|---|---|
| 0 | 2 | 0(0) | 0 |
| 1 | 2 | 1(2) | 0 |
| 2 | 2 | 1(2) | 2 |
| 3 | — | — | — |
| 4 | — | — | — |
| 5 | — | — | — |

TABLE 1.2-continued

Modulation order, transport block size index, and redundancy version when the number of allocated sub-carriers is 2

| MCS index $I_{MCS}$ | Modulation order $Q_m$ | TBS index $I_{TBS}$ | Redundancy Version $rv_{idx}$ |
|---|---|---|---|
| 6 | — | — | — |
| 7 | — | — | — |

TABLE 1.3

Modulation order, transport block size index, and redundancy version when the number of allocated sub-carriers is 4

| MCS index $I_{MCS}$ | Modulation order $Q_m$ | TBS index $I_{TBS}$ | Redundancy Version $rv_{idx}$ |
|---|---|---|---|
| 0 | 2 | 0(0) | 0 |
| 1 | 2 | 1(2) | 0 |
| 2 | 2 | 2(4) | 0 |
| 3 | 2 | 2(4) | 2 |
| 4 | — | — | — |
| 5 | — | — | — |
| 6 | — | — | — |
| 7 | — | — | — |

In the embodiment, the equipment searches the mapping relationship table between the $I_{TBS}$, the number of RUs, $N_{RU}$, and the TBS (i.e., transport block size table) according to the $I_{TBS}$ and the number of allocated RUs and obtains the TBS. Examples of the TBS are referred to Table 1.4, and in the single carrier case, one RU includes one carrier and has a time length of 8 ms. (2,4)-TPSK may occupy columns of the TBS table corresponding to cases that the $N_{RU}$ is equal to 2, 4, 6, . . . , 2m, where m is a positive integer, and the scheduling granularity is two RUs. (4.4)-TPSK may occupy columns of the TBS table corresponding to cases that the RU is 4, 8, 12, . . . , 4n, where n is a positive integer, and the scheduling granularity is four RUs. By defining the RU, each RU corresponds to the same time and frequency resource size, and the number of RUs scheduled by TPSK is limited, so that the TBS table is unified under different modulation schemes and resource scheduling.

TABLE 1.4

| | $N_{RU}$ | | | | | |
|---|---|---|---|---|---|---|
| $I_{TBS}$ | 1 | 2 | 3 | 4 | 5 | 6 |
| 0(0) | 16 | 32 | 56 | 88 | 120 | 152 |
| 1(2) | 32 | 56 | 120 | 176 | 208 | 256 |
| 2(4) | 56 | 120 | 208 | 256 | 328 | 392 |
| 3(6) | 88 | 176 | 256 | 392 | 504 | 600 |
| 4(8) | 120 | 256 | 392 | 504 | 680 | 808 |

The equipment processes the transport block on a transmission side such as modulation coding according to the obtained modulation and coding scheme and maps the uplink data onto the corresponding time and frequency domain resources. The equipment transmits data to the base station.

Application Embodiment 2

The main difference between the embodiment and the application embodiment 1 is that the MCS table is different.

According to the $I_{MCS}$, the equipment obtains the modulation order, transport block size index $I_{TBS}$, and redundancy version $rv_{idx}$ of uplink data from a table of the modulation order, transport block size index, and redundancy version. Examples of the table of the modulation order, transport block size index, and redundancy version when the number of allocated sub-carriers is 1, 2, or 4 are respectively referred to Tables 2.1, 2.2, and 2.3.

TABLE 2.1

Modulation order, transport block size index, and redundancy version when the number of allocated sub-carriers is 1

| MCS index $I_{MCS}$ | Modulation order $Q_m$ | TBS index $I_{TBS}$ | Redundancy Version $rv_{idx}$ |
|---|---|---|---|
| 0 | 1 | 0(0)* | 0 |
| 1 | 2 | 1(2) | 0 |
| 2 | 2 | 2(4) | 0 |
| 3 | 2 | 3(6) | 0 |
| 4 | 2 | 4(8) | 0 |
| 5 | 2 | 2(4) | 2 |
| 6 | 2 | 3(6) | 2 |
| 7 | 2 | 4(8) | 2 |

TABLE 2.2

Modulation order, transport block size index, and redundancy version when the number of allocated sub-carriers is 2

| MCS index $I_{MCS}$ | Modulation order $Q_m$ | TBS index $I_{TBS}$ | Redundancy Version $rv_{idx}$ |
|---|---|---|---|
| 0 | 2 | 0(0) | 0 |
| 1 | 2 | 1(2) | 0 |
| 2 | 2 | 1(2) | 2 |
| 3 | — | — | — |

TABLE 2.3

Modulation order, transport block size index, and redundancy version when the number of allocated sub-carriers is 4

| MCS index $I_{MCS}$ | Modulation order $Q_m$ | TBS index $I_{TBS}$ | Redundancy Version $rv_{idx}$ |
|---|---|---|---|
| 0 | 2 | 0(0) | 0 |
| 1 | 2 | 1(2) | 0 |
| 2 | 2 | 2(4) | 0 |
| 3 | 2 | 2(4) | 2 |

In the embodiment, when the number of allocated sub-carriers is 1, 8 levels exist in the MCS table in table 2.1, that is, the $I_{MCS}$ uses 3 bits. When the number of allocated sub-carriers is 2 or 4, that is, when the modulation scheme is respectively (2,4)-TPSK and (4,4)-TPSK, only four levels exist in the MCS table in table 2.2 and 2.3, that is, the $I_{MCS}$ uses 2 bits. When the number of allocated sub-carriers is 2 or 4, 1 bit of the 3 bits of the original modulation-coding-scheme indicator domain $I_{MCS}$ of is used for indicating the sub-carrier position. In the embodiment, the DCI carries 6 bits of resource indication information domain for indicating the joint information of the start position of allocated sub-carriers and the number of allocated sub-carriers. The resource indication information domain for indicating the joint information of the start position of allocated sub-carriers and the number of allocated sub-carriers refers to that one value of the resource indication domain corresponds to one available combination of the start position of allocated sub-carriers and the number of allocated sub-carriers. Among the 64 states corresponding to 6 bits carried in the DCI, 16 states are used for indicating the start position of allocated sub-carriers in the (2,4)-TPSK or the start position of allocated sub-carriers in the (4,4)-TPSK. As 1 bit (i.e., the rest bit) in the original modulation-coding-scheme indicator domain $I_{MCS}$ of 3 bits is used for indicating the sub-carrier position when the number of allocated sub-carriers is 2 or 4, 16 states are added to indicate the sub-carrier position. The rest bit of the original modulation-coding-scheme indicator domain $I_{MCS}$ is used for indicating the sub-carrier position, so that the possibilities of the sub-carrier position are increased and the scheduling flexibility is improved.

Application Embodiment 3

The main difference between the embodiment and the application embodiment 2 is that the MCS table is different. According to the $I_{MCS}$, the equipment obtains the modulation order, transport block size index $I_{TBS}$, and redundancy version $rv_{idx}$ of uplink data from a table of the modulation order, transport block size index, and redundancy version. Examples of the table of the modulation order, transport block size index, and redundancy version when the number of allocated sub-carriers is 1, 2, or 4 are respectively referred to Tables 2.1, 3.2, and 2.3.

TABLE 3.2

Modulation order, transport block size index, and redundancy version when the number of allocated sub-carriers is 2

| MCS index $I_{MCS}$ | Modulation order $Q_m$ | TBS index $I_{TBS}$ | Redundancy Version $rv_{idx}$ |
|---|---|---|---|
| 0 | 2 | 0(0) | 0 |
| 1 | 2 | 1(2) | 0 |
| 2 | 2 | 1(2) | 2 |
| 3 | Used for jointly indicating resource allocation and code rates | | |

The difference between tables 3.2 and 2.2 is that in Table 3.2 the MCS level when the $I_{MCS}$ is 3 is used for indicating resource allocation, while in Table 2.2 the MCS level when the $I_{MCS}$ is 3 is null. As stated in application embodiment 2, the DCI further carries 6 bits of resource indication information domain for indicating the joint information of the start position of allocated sub-carriers and the number of allocated sub-carriers. Assuming that among the 64 states corresponding to 6 bits carried in the DCI, 12 states are used for indicating the start position of allocated sub-carriers in the (2,4)-TPSK. As 1 bit of the 3 bits the original modulation-coding-scheme indicator domain $I_{MCS}$ is used for indicating the sub-carrier position, 24 states may be used for indicating the start position of allocated sub-carriers in the (2,4)-TPSK. That the last state in the states corresponding to 2 bits of the modulation-coding-scheme indicator domain $I_{MCS}$ is used for indicating the joint information of the resource allocation and code rates, which refers to that when the number of allocated sub-carriers is 2, some states are added on the basis of the 24 states to indicate the sub-carrier position. The added some states further indicate code rates.

Application Embodiment 4

The main difference between the embodiment and the application embodiment 1 is how to divide sets of the number of allocated sub-carriers and design the MCS table.

In the embodiment, the number of allocated sub-carriers of single carrier uplink transmission of the equipment may be 1, 2, or 4. The number of allocated sub-carriers is divided into two sets: {1} and {2,4}. Two sets of the modulation scheme corresponding to the two sets {1} and {2,4} are respectively {BPSK, QPSK} in Table 1.1 and {(2,4-TPSK), (4,4-TPSK)} in Table 4.2, or are respectively {pi/2 BPSK, pi/4 QPSK} in Table 1.1 and {(2,4-TPSK),(4,4-TPSK)} in Table 4.2. When the number of allocated sub-carriers is 1, 2, or 4, according to the $I_{MCS}$, the equipment respectively obtains the modulation coding scheme and may further respectively obtain the redundancy version from Table 1.1, 4.2, and 4.2.

TABLE 4.2

Modulation order, transport block size index, and redundancy version when the number of allocated sub-carriers is 2 or 4

| MCS index $I_{MCS}$ | Modulation order $Q_m$ | TBS index $I_{TBS}$ | Redundancy Version $rv_{idx}$ |
|---|---|---|---|
| 0 | (4,4)-TPSK | 0(0) | 0 |
| 1 | (4,4)-TPSK | 1(2) | 0 |
| 2 | (2,4)-TPSK | 2(4) | 0 |
| 3 | (2,4)-TPSK | 3(6) | 0 |
| 4 | (4,4)-TPSK | 1(2) | 2 |
| 5 | (2,4)-TPSK | 2(4) | 2 |
| 6 | (2,4)-TPSK | 3(6) | 2 |
| 7 | — | — | — |

In the embodiment, the DCI carries 6 bits of resource indication information domain for indicating the joint information of the start position of allocated sub-carriers and the number of allocated sub-carriers. One value of the resource indication information domain corresponds to one available combination of the start position of allocated sub-carriers and the number of allocated sub-carriers. The equipment reads resource indication information and obtains a set of the number of allocated sub-carriers for uplink transmission. When the set of the number of allocated sub-carriers is {2, 4}, the equipment determines a specific TPSK modulation scheme according to the MCS table. Relative to that one value of the resource indication information domain corresponds to one available combination of the start position of allocated sub-carriers and the number of allocated sub-carriers, one value of the domain corresponds to one available combination of the start position of allocated sub-carriers and the number of allocated sub-carriers and the modulation scheme is distinguished according to the MCS table, which may increase the number of possible positions of allocated sub-carriers and improve scheduling flexibility.

Application Embodiment 5

The main difference between the embodiment and the application embodiment 1 is that 3 bits of the RU number indicator domain in the DCI indicates different information. In the application embodiment 1, 8 states corresponding to 3 bits indicate 8 RU numbers. In the embodiment, when the number of allocated sub-carriers is 1, the 3 bits correspond to 8 RU numbers; when the number of allocated sub-carriers is 2 or 4, that is, when the TPSK modulation scheme is configured, only 2 bits in the 3 bits are used for indicating 4 available RU numbers, the rest 1 bit (i.e., the other rest other than the 2 bits in the 3 bits) is used for jointly indicating the start position of allocated sub-carriers and the number of allocated sub-carriers with a resource indication information domain of 6 bits. For example, among the 64 states corresponding to 6 bits, 16 states are used for indicating the start position of allocated sub-carriers in the (2,4)-TPSK or the start position of allocated sub-carriers in the (4,4)-TPSK. As 1 bit of the 3 bits of the original RU number indicator domain is used for indicating the sub-carrier position when the number of allocated sub-carriers is 2 or 4, another 16 states are added to indicate the sub-carrier position. In the case of fully utilizing the TBS table of the protocol, the possibilities of scheduling the number of RUs by the TPSK are limited (see Application Embodiment 1). The rest bit of the RU number indicator domain is used for indicating the sub-carrier position, and this may increase possibilities of the sub-carrier position and improve scheduling flexibility.

Application Embodiment 6

The main difference between the embodiment and the application embodiment 1 is that the MCS table is different. According to the $I_{MCS}$, the equipment obtains the modulation order, transport block size index $I_{TBS}$, and redundancy version $rv_{idx}$ of uplink data from a table of the modulation order, transport block size index, and redundancy version. Examples of the table of the modulation order, transport block size index, and redundancy version when the number of allocated sub-carriers is 1, 2, or 4 are respectively referred to Tables 1.1, 6.2, and 6.3.

TABLE 6.2

Modulation order, transport block size index, and redundancy version when the number of allocated sub-carriers is 2

| MCS index $I_{MCS}$ | Modulation order $Q_m$ | TBS index $I_{TBS}$ | Redundancy Version $rv_{idx}$ |
|---|---|---|---|
| 0 | 2 | 0(0) | 0 |
| 1 | — | — | — |
| 2 | — | — | — |
| 3 | — | — | — |
| 4 | — | — | — |
| 5 | — | — | — |
| 6 | — | — | — |
| 7 | — | — | — |

TABLE 6.3

Modulation order, transport block size index, and redundancy version when the number of allocated sub-carriers is 4

| MCS index $I_{MCS}$ | Modulation order $Q_m$ | TBS index $I_{TBS}$ | Redundancy Version $rv_{idx}$ |
|---|---|---|---|
| 0 | 2 | 0(0) | 0 |
| 1 | — | — | — |
| 2 | — | — | — |
| 3 | — | — | — |
| 4 | — | — | — |
| 5 | — | — | — |
| 6 | — | — | — |
| 7 | — | — | — |

All spectral efficiency in Tables 6.2 and 6.3 is the spectral efficiency of the BPSK in Table 1.1, that is, Tables 6.2 and 6.3 both uses the spectral efficiency of the BPSK in Table 1.1. Such a design mainly considers performance. Under the same spectral efficiency, the performance of (2,4)-TPSK and (4,4)-TPSK is poorer than that of QPSK and thus only the BPSK is designed to correspond to the TPSK MCS level of the spectral efficiency.

Application Embodiment 7

The difference between the embodiment and the application embodiment 1 is the transport block size table. In the embodiment, the equipment searches the mapping relationship table between the $I_{TBS}$ and $N_{RU}$ onto the TBS (i.e., transport block size table in Table 7.4) according to the $I_{TBS}$ and the number of allocated RUs, and obtains the TBS. Columns corresponding to cases that the RU number is 8 and 16 are added in Table 7.4 compared with Table 1.4. The advantage is that at a small $I_{TBS}$, that is, at a low code rate, a bigger TBS may be invoked and the signaling overhead is not increased, which refers to that the RU number is limited to a certain range.

TABLE 7.4

| $I_{TBS}$ | $N_{RU}$ | | | | | | | |
|---|---|---|---|---|---|---|---|---|
| | 1 | 2 | 3 | 4 | 5 | 6 | 8 | 16 |
| 0(0) | 16 | 32 | 56 | 88 | 120 | 152 | 208 | 424 |
| 1(2) | 32 | 56 | 120 | 176 | 208 | 256 | 328 | 696 |
| 2(4) | 56 | 120 | 208 | 256 | 328 | 392 | 552 | |
| 3(6) | 88 | 176 | 256 | 392 | 504 | 600 | 808 | |
| 4(8) | 120 | 256 | 392 | 504 | 680 | 808 | | |

The method for determining transmission parameters according to the embodiments of the present disclosure can solve the problem of transport block determination and resource allocation in the NB-IoT. The method is compatible with various modulation and coding schemes, achieves adaptive modulation coding and improves scheduling flexibility and system capacity at the cost of limited signaling overhead.

It should be understood by those skilled in the art that functional modules/units in all or some steps of the method, the system, and the device disclosed above may be implemented as software, firmware, hardware, and combinations thereof. In the hardware implementation, the division of functional modules/units mentioned in the above description may not correspond to the division of physical units. For example, one physical component may have several functions, or one function or step may be executed jointly by several physical components. Some or all components may be implemented as software executed by processors such as digital signal processors and microprocessors, hardware, or integrated circuits such as application specific integrated circuits. Such software may be distributed on computer-readable media, which may include computer storage media (non-transient media) and communications media (transient media). As is known to those skilled in the art, the term, computer storage media, includes volatile and nonvolatile, removable and non-removable media implemented in any method or technology for storing information (such as computer-readable instructions, data structures, program modules or other data). The computer storage media include, but are not limited to RAM, ROM, EEPROM, flash memory or other memory technologies, CD-ROM, digital versatile disc, DVD, or other optical disc storage, magnetic cassette, magnetic tape, magnetic disk storage or other magnetic storage devices, or any other media used for storing desired information and accessible by the computer. Moreover, as is known to those skilled in the art, communications media generally include computer-readable instructions, data structures, program modules, or other data in modulated data signals such as carriers or other transmission mechanisms, and may include any information delivery media. The above-mentioned software product may be stored on one storage medium (such as ROM, RAM, magnetic disks, and optical disks), and the storage medium contains a number of instructions for enabling an equipment device (which may be a mobile phone, a computer, a server, or a network device, etc.) to perform the method described in any embodiment of the present disclosure.

The various modules described above may be implemented by software or hardware. Implementation by hardware may, but may not necessarily, be performed by the following method: The various modules described above are located in a same processor or their respective processors.

Embodiments of the present disclosure further provide a storage medium. In the embodiment, the storage medium may be configured to store program codes for executing the steps described below.

In S1, a first node receives the DCI transmitted by a second node.

In S2, the first node determines transmission information according to a predetermined information combination in the DCI transmitted by the second node. The transmission information includes: a modulation coding scheme, joint information of the modulation coding scheme and a sub-carrier position, or sub-cattier position information. The predetermined information combination includes one of the following: a combination of a modulation-coding-scheme indicator domain $I_{MCS}$ and a number of allocated sub-carriers, a combination of a resource-unit (RU) number indicator domain and the number of allocated sub-carriers.

In an embodiment, the storage medium may be further configured to store program codes for executing the steps of the method described in the above embodiments.

In the embodiment, the storage medium may include, but is not limited to, a U disk, a read-only memory, ROM, a random access memory, RAM, a mobile hard disk, a magnetic disk, an optical disk or another medium capable of storing program codes.

In the embodiment, the processor executes the steps of the method described in the above embodiments according to the program codes stored in the storage medium.

For specific examples in the embodiment, reference may be made to the examples described in the above embodiments and optional embodiments, and the specific examples will not be repeated in the embodiment.

Apparently, those skilled in the art should know that each above-mentioned module or step of the present disclosure may be implemented by a universal computing device, they may be concentrated on a single computing device or distributed on a network formed by multiple computing devices, and alternatively, they may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation. In this way, the present disclosure is not limited to any specific combination of hardware and software.

For those skilled in the art, various modifications and variations may be made to the embodiments of the present disclosure. Any modifications, equivalent replacements and improvements within the spirit and principle of the technical solutions of the present application should be within the scope of the appended claims.

INDUSTRIAL APPLICABILITY

When the technical solutions according to the embodiments of the present disclosure are used, the problem that correct coding-decoding and resource allocation cannot be performed in the NB-IoT system is solved and the determination of modulation coding information, a transport block size, and sub-carrier position information in the NB-IoT system may be achieved.

What is claimed is:

1. A method for determining transmission information, comprising:
   determining, by a first node, the transmission information according to a predetermined information combination in Downlink Control Information, DCI, transmitted by a second node,
   wherein the transmission information comprises: a modulation coding scheme, joint information of the modulation coding scheme and a sub-carrier position, or sub-carrier position information; and
   wherein the predetermined information combination comprises one of the following: a combination of a modulation-coding-scheme indicator domain $I_{MCS}$ and a number of allocated sub-carriers, and a combination of a Resource-Unit, RU, number indicator domain and the number of allocated sub-carriers; and
   wherein determining, according to the predetermined information combination, the transmission information comprises one of the following modes:
   in a first mode, determining, according to the modulation-coding-scheme indicator domain $I_{MCS}$ and the number of allocated sub-carriers, one of the following: the modulation coding scheme and the joint information of the modulation coding scheme and the sub-carrier position; and
   in a second mode, determining, according to the Resource-Unit, RU, number indicator domain and the number of allocated sub-carriers, the sub-carrier position information.

2. The method according to claim 1, wherein determining, according to the predetermined information combination, the transmission information in the first mode comprises:
   dividing different sub-carrier numbers into N0 mutually exclusive sets of sub-carrier numbers, each of N0 mutually exclusive sets being corresponding to one respective set of modulation schemes; and
   determining, according to the number of allocated sub-carriers, one respective set of modulation schemes;
   wherein elements of sets of modulation schemes comprise at least one of the following:
   Binary Phase Shift Keying, BPSK, Quadrature Phase Shift Keying, QPSK, pi/2 BPSK, pi/4 QPSK, and (M,N)-TPSK, wherein the (M,N)-TPSK is Tone Phase Shift Keying, TPSK, defined by a specified carrier number M and a specified constellation point number N, and N1 sets of modulation schemes corresponding to the N0 mutually exclusive sets of sub-carrier numbers are mutually exclusive, and wherein M, N, N0 and N1 are positive integers.

3. The method according to claim 1, wherein in the predetermined information combination in the first mode,
   when the number of allocated sub-carriers is larger than a first predetermined value S1, spectral efficiency corresponding to a modulation coding scheme indicated by the $I_{MCS}$ belongs to a first set A, and elements of the first set A are spectral efficiency obtained by multiplying all spectral efficiency corresponding to the modulation coding scheme indicated by the $I_{MCS}$ by a specified factor A1 when the number of allocated sub-carriers is equal to S1; or
   when the number of allocated sub-carriers is larger than a first predetermined value S1, spectral efficiency corresponding to a modulation coding scheme indicated by $I_{MCS}$ belongs to a first set A, and elements of the first set A are spectral efficiency obtained by multiplying all spectral efficiency corresponding to a specified modulation scheme by the specified factor A1 when the number of allocated sub-carriers is equal to S1;
   wherein S1 is a positive integer and A1 is a real number larger than 0.

4. The method according to claim 1, wherein determining, according to the predetermined information combination, the transmission information in the first mode comprises:
   when the number of allocated sub-carriers is smaller than a second predetermined value S2, using all available values of the $I_{MCS}$ to indicate the modulation coding scheme, and determining the modulation coding scheme according to the $I_{MCS}$, wherein S2 is a positive integer larger than 1.

5. The method according to claim 2, wherein determining, according to the predetermined information combination, the transmission information in the first mode comprises:
   when the number of allocated sub-carriers is larger than a third predetermined value S3 and a value of the $I_{MCS}$ belongs to a first predetermined set B1, determining the modulation coding scheme by the $I_{MCS}$;
   when the number of allocated sub-carriers is larger than a third predetermined value S3 and the value of the $I_{MCS}$ belongs to a second predetermined set B2, determining, by the $I_{MCS}$, the joint information of the modulation coding scheme and the sub-carrier position, or indicating, by the $I_{MCS}$, no information;
   wherein B1 and B2 constitute a subset of a set of all available values of the $I_{MCS}$, B1 and B2 are mutually exclusive when B1 and B2 are both non-empty sets, and S3 is a positive integer.

6. The method according to claim 5, wherein
   the first predetermined set B1 is composed of values of the $I_{MCS}$ smaller than or equal to a fourth predetermined value X1 and larger than or equal to a fifth predetermined value X2, and the second predetermined set B2 is composed of values of the $I_{MCS}$ larger than the fourth predetermined value X1 and values of the $I_{MCS}$ smaller than the fifth predetermined value X2; or
   the first predetermined set B1 is composed of values of the $I_{MCS}$ smaller than or equal to the fourth predetermined value X1, and the second predetermined set B2 is composed of values of the $I_{MCS}$ larger than the fourth predetermined value X1;
   wherein X1 and X2 are non-negative integers and X2 is smaller than or equal to X1.

7. The method according to claim 5, wherein determining, by the $I_{MCS}$, the joint information of the modulation coding scheme and the sub-carrier position comprises:
   jointly indicating, by the $I_{MCS}$ and a sub-carrier position information indicator domain, the joint information of the modulation coding scheme and the sub-carrier position;
   wherein the sub-carrier position information indicator domain is configured to determine the number of allocated sub-carriers.

8. The method according to claim 1, wherein determining, according to the predetermined information combination, the transmission information in the first mode comprises:
   using X4 bits of X3 bits of the modulation-coding-scheme indicator domain $I_{MCS}$ to indicate the modulation coding scheme or indicate the joint information of the modulation coding scheme and the sub-carrier position; and using rest (X3-X4) bits to indicate the sub-carrier position;
wherein X3 and X4 are positive integers and X4 is smaller than X3.

9. The method according to claim 1, wherein determining, according to the Resource-Unit, RU, number indicator domain and the number of allocated sub-carriers, the sub-carrier position information comprises:
using X6 bits of X5 bits of the RU number indicator domain to indicate an RU number; and
using rest (X5-X6) bits to indicate the sub-carrier position;
wherein X5 and X6 are positive integers and X6 is smaller than X5.

10. The method according to claim 1, wherein determining, according to the Resource-Unit, RU, number indicator domain and the number of allocated sub-carriers, the sub-carrier position information comprises:
jointly indicating, by the RU number indicator domain and a sub-carrier position information indicator domain, the sub-carrier position;
wherein the sub-carrier position information indicator domain is configured to determine the number of allocated sub-carriers.

11. The method according to claim 1, wherein determining, according to the RU number indicator domain and the number of allocated sub-carriers, the sub-carrier position information comprises:
when the number of allocated sub-carriers is larger than a sixth predetermined value S4, or when the first node uses a TPSK modulation scheme for transmission, determining, according to the RU number indicator domain, the sub-carrier position information, wherein S4 is a positive integer.

12. The method according to claim 1, wherein
the predetermined information combination further comprises: the modulation-coding-scheme indicator domain $I_{MCS}$, the number of allocated sub-carriers, and the RU number indicator domain;
after the first node determines the modulation coding scheme, the method further comprises:
determining, by the first node, a transport block size according to the modulation coding scheme and an RU number;
wherein an RU comprises one of the following features:
different RUs have an identical number of available resource elements (REs);
when the number of allocated sub-carriers is larger than 1, the RU number is a positive integer multiple of the number of allocated sub-carriers; and
when a modulation scheme is TPSK, the RU number is a positive integer multiple of the number of allocated sub-carriers.

13. The method according to claim 1, wherein
a set of values of a RU comprises the following elements:
the smallest R1 continuous positive integers and the largest R2 integer powers of 2;
wherein R1 and R2 are both positive numbers larger than or equal to 2, the sum of R1 and R2 is smaller than or equal to R, and R is a number of available values of the RU.

14. The method according to claim 1, wherein
the number of allocated sub-carriers is determined according to a sub-carrier position information indicator domain in the DCI.

15. A device for determining transmission information located in a first node, comprising a processor and a memory for storing execution instructions that when executed by the processor cause the processor to perform steps in following modules:
a receiving module (22), configured to receive Downlink Control Information, DCI, transmitted by a second node; and
a determining module (24), configured to determine the transmission information according to a predetermined information combination in the DCI;
wherein the transmission information comprises: a modulation coding scheme, joint information of the modulation coding scheme and a sub-carrier position, or sub-carrier position information; and
wherein the predetermined information combination comprises one of the following: a combination of a modulation-coding-scheme indicator domain $I_{MCS}$ and a number of allocated sub-carriers, and a combination of a Resource-Unit, RU, number indicator domain and the number of allocated sub-carriers;
wherein the determining module (24) is configured to determine the transmission information according to the predetermined information combination by using one of the following modes:
in a first mode, the determining module (24) is configured to determine, according to the modulation-coding-scheme indicator domain $I_{MCS}$ and the number of allocated sub-carriers, one of the following: the modulation coding scheme and the joint information of the modulation coding scheme and the sub-carrier position; and
in a second mode, the determining module (24) is configured to determine, according to the Resource-Unit, RU, number indicator domain and the number of allocated sub-carriers, the sub-carrier position information.

16. The device according to claim 15, wherein
the predetermined information combination further comprises: the modulation-coding-scheme indicator domain $I_{MCS}$, the number of allocated sub-carriers, and the Resource-Unit, RU, number indicator domain;
the determining module (24) is further configured to determine a transport block size according to the modulation coding scheme and an RU number, wherein a RU comprises one of the following features:
different RUs have an identical number of available resource elements (REs);
when the number of allocated sub-carriers is larger than 1, the RU number is a positive integer multiple of the number of allocated sub-carriers; and
when a modulation scheme is TPSK, the RU number is a positive integer multiple of the number of allocated sub-carriers.

17. A system for determining transmission information, comprising: a first node and a second node; wherein
the first node is configured to determine transmission information according to a predetermined information combination in Downlink Control Information, DCI, transmitted by the second node,
wherein the transmission information comprises a modulation coding scheme, joint information of the modulation coding scheme and a sub-carrier position, or sub-carrier position information, and wherein the predetermined information combination comprises one of the following: a combination of a modulation-coding-scheme indicator domain Imcs and a number of allocated sub-carriers, and a combination of a Resource-Unit, RU, number indicator domain and the number of allocated sub-carriers;

wherein the first node is configured to determine transmission information according to a predetermined information combination by using one of the following modes:

in a first mode, the first node is configured to determine, according to the modulation-coding-scheme indicator domain Imcs and the number of allocated sub-carriers, one of the following: the modulation coding scheme and the joint information of the modulation coding scheme and the sub-carrier position; and in a second mode, the first node is configured to determine, according to the Resource-Unit, RU, number indicator domain and the number of allocated sub-carriers, the sub-carrier position information.

18. A non-transitory computer-readable storage medium storing computer-executable instructions, wherein the computer-executable instructions are configured to execute the method according to claim 1.

* * * * *